June 29, 1943.  R. HALL ET AL  2,323,179
PACKED TYPE EXPANSION JOINT
Filed Nov. 9, 1940  2 Sheets-Sheet 1
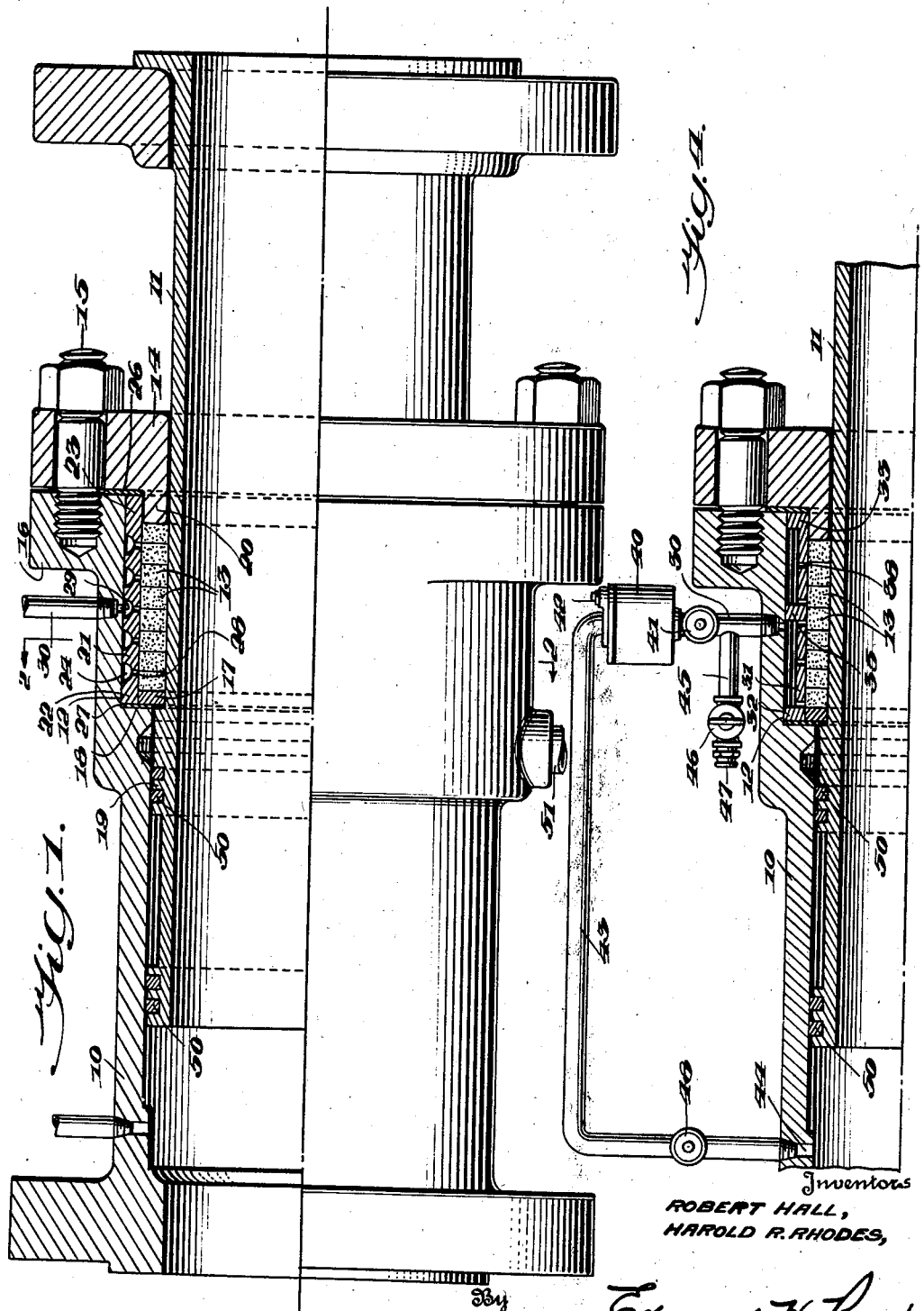
Inventors
ROBERT HALL,
HAROLD R. RHODES,
By Edmund H. Parry
Attorney

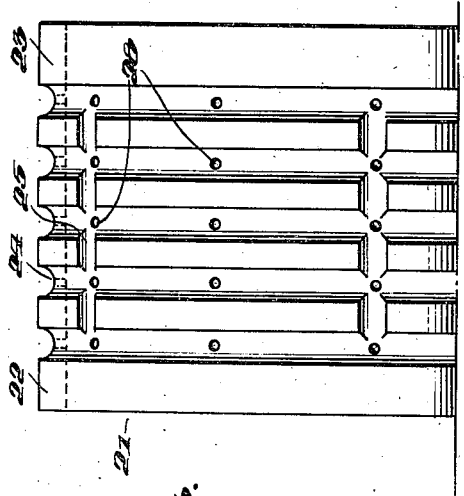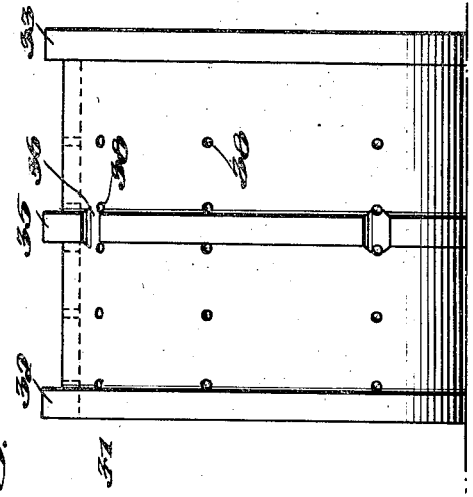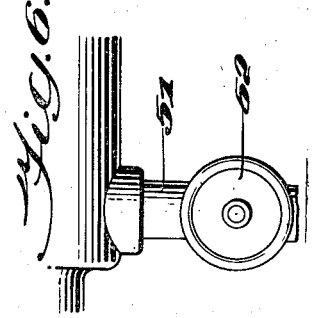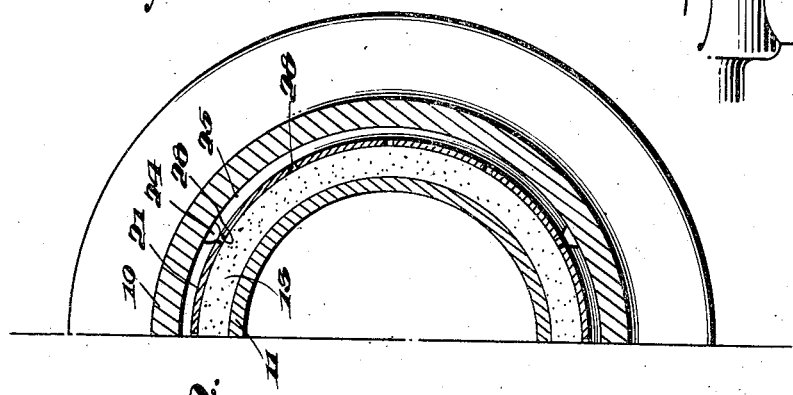

Patented June 29, 1943

2,323,179

UNITED STATES PATENT OFFICE 2,323,179

PACKED TYPE EXPANSION JOINT

Robert Hall, Lockport, and Harold R. Rhodes, North Tonawanda, N. Y., assignors to American District Steam Company, North Tonawanda, N. Y., a corporation of New York Application November 9, 1940, Serial No. 365,118

4 Claims. (Cl. 285—162)

This invention relates to expansion joints adapted for use in steam and similar pipe lines wherein it is necessary to make provision for shifting, expansion and contraction of the pipe sections under changes in the conditions under which they operate.

The invention has particular reference to the type of expansion joint wherein fibrous packing rings are interposed between the relatively slidable joint members to seal the joint against leakage. It has been found difficult to effect a perfect seal in such a construction due to the tendency of the packing rings to leak. The fibrous packing rings contain a certain amount of oil, paraffin and various other foreign substances which tend to evaporate, boil out or disintegrate under high temperature conditions, leaving voids in the packing which allows fluid under the internal pressure existing in the pipe line to leak out. The higher the internal pressure the greater the danger of leakage, and the more frequent the requirement for replacement of the packing rings.

The present invention is calculated to overcome the difficulties just referred to by distributing to the packing rings, and more or less impregnating the same with a substance under high pressure after the parts of the expansion joint are assembled. Such substance should be sufficiently fluid to permit a proper distribution to the various parts of the packing, but nevertheless should have sufficient body to cooperate with the packing rings to produce a seal such as will withstand internal pressure in the expansion joint under all normal operating conditions.

A problem arises in securing proper distribution of the supplementary fluent packing substance uniformly to the different parts of the fibrous packing rings, and it is a particular feature of the invention to provide a construction which permits this to be done. The proposed construction is such that the fluent packing may be introduced into the joint from the outside at a single point, and thence be distributed uniformly both circumferentially and axially throughout the entire area of the fibrous packing. To this end the usual packing ring chamber is made of larger diameter than is customary to provide an annular chamber surrounding the fibrous packing rings, and in such surrounding outer chamber is disposed a structure which supports the outer periphery of the packing rings, and permits the fluent packing material to be distributed uniformly to all parts thereof from the outer chamber.

In the usual type expansion joint the packing rings are compressed axially by means of an adjustable flanged gland element which may be adjusted axially by means of a series of bolts which secure the same to the outer body member of the expansion joint. In the present construction a gland element is employed to support one end of the packing rings. Such gland element is preferably provided with a relatively short ring-engaging lip, and is initially tightened to its full extent when the joint parts are assembled so as to preliminarily compress the packing rings to a packed tight condition. Thereafter the gland element need not be adjusted in use to further compress the packing rings to close voids developing therein, since sealing contact of the packing with the joint member which is slidable relative thereto is obtained, and maintained, by the pressure of the supplementary fluent packing which is distributed throughout, and fills all voids in, the packing rings.

The invention will be understood from the several illustrative embodiments thereof shown in the accompanying drawings and the following detailed description thereof.

In such drawings:

Fig. 1 is a longitudinal view partly in section and partly in elevation of a packed tight expansion joint embodying the present invention;

Fig. 2 is a transverse section taken on the line 2—2 of Fig. 1;

Fig. 3 is a fragmentary side view of one of the parts shown in Figs. 1 and 2.

Fig. 4 is a fragmentary view in longitudinal section involving certain modifications over the form of the invention in Fig. 1, and also showing certain additional features of the invention;

Fig. 5 is a fragmentary side view of one of the parts shown in Fig. 4; and

Fig. 6 is a fragmentary side elevation of certain parts of an expansion joint which may be employed with the invention.

The expansion joint shown in Figs. 1 and 2 comprises a plurality of expansion joint members telescopically arranged one within the other for longitudinal movement, the outer member being designated 10 and the inner member 11, and having flanged outer ends adapted to be connected intermediate the ends of two sections of a steam or other pipe line. The bore of the outer member 10 is enlarged adjacent its inner end to provide an annular chamber 12 in which is received fibrous packing in the form of a series of packing rings 13 against which the inner joint member 11 has a sliding movement. The outer end of the annular chamber 12 is closed by a flanged gland element 14 which is secured by a series of bolts 15 to flange 16 of the outer joint member 10. As shown, a metallic ring 17 seating against shoulder 18 at the inner end of chamber 12 may be provided to support the inner end of the series of packing rings, and the inner joint member may be provided with an enlarged end 19 coactive with ring 17 to provide a stop limiting the outward movement of the joint members, all as more fully disclosed and explained in Hall Patent No. 1,926,003, granted September 5, 1933. End 19 may, if desired, be provided with a plurality of grooves seating metallic piston rings 50 coactive with the inner periphery of joint member 10 as also shown in said patent.

Lip 20 of the gland element 14 can be made relatively short as shown, and the gland element may be initially adjusted into tight engagement with flange 16 of the outer joint member by tightening down bolts 15 to their full extent. This is possible by reason of the provision of further means for applying pressure to the packing rings now to be explained.

It will be observed that the annular chamber 12 in the outer joint member 10 is made of substantially larger diameter than the packing rings 13 so as to provide an annular chamber portion overlying the entire width and circumference of the packing rings. Disposed in such outer chamber portion is a rigid metal ring member 21 which embraces and supports the outer periphery of the packing rings 13, and which extends the full length of the chamber 12 so as to seat at one end against shoulder 18 of outer member 10 and at the other end against gland element 14. As best shown in Fig. 3, ring 21 is provided with a series of intercommunicating circumferential channels 24 and a series of circumferentially distributed axially extending channels 25. The opposite ends 22 and 23 of ring 21 are of sufficient thickness to form a relatively tight fit between the inner periphery of the outer joint member 10 at chamber 12 and the outer peripheries of ring 17 and lip 20. The ring is therefore rigidly supported against axial movement and against radial movement relative to the packing rings 13 and the joint members 10 and 11. Preferably gasket rings 26 and 27 are interposed between the respective ends of ring 21 and gland element 14 and shoulder 18 so as to prevent leakage of fluid pressure around the ends 22 and 23 of ring 21 in either direction.

Uniformly distributed throughout the axial and circumferential extent of ring 21 are a series of bores, or apertures 28 communicating with the various channels 24 and 25. Preferably as best shown in Fig. 3, certain lines at least of bores 28 are arranged at the lines of intersection between the circumferential and axial channels. Communicating with chamber 12 exteriorly of ring 21 is a port 29 connecting with an inlet element 30 secured in the wall of the outer joint member. Member 30 is preferably provided with a valve (not shown).

After the joint members have been assembled and gland member 14 is tightened down, as previously explained, on the packing rings 13, a fluent packing material is introduced under pressure into the outer portion of chamber 12 exteriorly of ring 21 through inlet member 30. Any known form of packing gun can be used for the purpose, although it is desirable that such gun or other means for introducing the fluent packing shall be capable of providing relatively high pressures. For example, a pressure gun such as marketed under the trade name "Alemite" may be employed, and a suitable valve fitting, or nipple, for connection with such gun provided on the inlet member 30. The fluent packing material will preferably comprise a mixture of graphite in a high temperature oil vehicle. When such substance is introduced through inlet member 30 it will fill the portion of chamber 12 outside of metal ring 21, and will be uniformly distributed axially and circumferentially of the ring by reason of the intercommunicating channels 24 and 25. From such channels the fluent packing substance will be introduced to the various packing rings 13 at the outer periphery thereof at a multiplicity of uniformly distributed axial and circumferential points through bores 28. All crevices existing in and/or between the various packing fibrous rings 13 will be filled by the fluent packing material, and because of the pressure with which the fluent packing material is introduced the rings 13 will be caused to closely embrace the outer periphery of the inner joint member 11 and effect a seal preventing internal joint pressure from leaking outwardly between the inner and outer joint members. Because of the tight fit of the end portions 22 and 23 of ring 21 with the coacting portions of the joints above referred to, and particularly by reason of the provision of gaskets 26 and 27 the fluent material may be introduced into chamber 12 through inlet member 30 under high pressure without danger of the material leaking around the ends of ring 21. The full pressure with which the fluent packing material is introduced is therefore exerted in securing uniform distribution of the material through the various bores 28 into the fibrous packing rings 13.

In Fig. 4 the main construction is the same as before but a different form of metal distributing ring 31 is employed in place of ring 21 of the previous embodiment. Instead of being provided with a plurality of circumferential grooves 24 ring 31 may be constructed with a continuous circumferential channel between the opposite end portions 32 and 33. A plurality of bores, or apertures, 38 will be arranged at intervals circumferentially and axially of ring 31 to provide for introduction of the fluent packing material from the portion of chamber 12 outside the ring to the fibrous packing rings 13 at a multiplicity of points. Preferably bores 38 will be arranged in circumferential lines adjacent the respective end portions 32 and 33, so as to insure distribution of the fluent packing material to the end members of the fibrous packing rings, and a number of additional lines of bores will be provided intermediate the two end lines, the number of lines being determined primarily by the axial length of ring 31. Axially extending lines of bores 38 should also be arranged at relatively frequent intervals circumferentially of the ring.

While ring 31 may be formed to provide an uninterrupted chamber between end portions 32 and 33, such arrangement may entail the use of a relatively thick ring in order to give adequate support to the outer periphery of the packing rings 13 and prevent warping. However, the ring may be made relatively thin by interposing a central reinforcing rib 35 as shown in Figs. 4 and 5, the same being of the same thickness as the end portions 32 and 33. Such rib will subdivide the outer periphery of the ring into two chamber portions, and the rib will be provided with a series of transverse grooves 36 at recurrent circumferential points to provide communication between the two chamber portions so that the fluent packing material may be distributed to all parts of the ring through a common inlet member 30 located on either side of the central rib 35.

During distribution of the fluent packing material through the fibrous packing rings 13 it is desirable to prevent the line pressure interiorly of the joint from reaching the packing rings. To this end it is desirable to provide a blowoff pipe 51, as shown in Figure 1, at the bottom of the outer joint member 10 at a point between the packing rings and the left end of inner joint member 11. Such blowoff pipe, as shown in Fig. 6, can be provided with a blowoff valve 52 which can be opened during the time fluent packing material is introduced through pipe 30 and ring 23 for distribution throughout the packing rings 13. Preferably and as shown in Fig. 1, blowoff pipe 51 will be located intermediate the packing rings 13 and the metallic piston rings 50 where the latter are employed.

As previously mentioned, the fluent material may be introduced into pipe 30 through the use of a suitable pressure gun. It is a further feature of the invention, however, to utilize the internal line pressure of the expansion joint itself as the means for effecting penetration of the fluent material through the fibrous packing rings 13. Such an arrangement is shown in connection with the embodiment of Fig. 4, but it is to be understood that the same is applicable also to the embodiment of Fig. 1. In such arrangement a fluent material reservoir 40 connects with the fluent material inlet element 30 under control of a valve 41. A removable plug 42 is provided in the top of the reservoir for introduction of the fluent material. Also communicating with the reservoir 40 is a line 43 connecting with the interior of the outer joint member 10 through bore 44 at a point beyond the left end limit of traverse of the inner joint member 11. Through such line the fluid pressure existing interiorly of the joint under operating conditions may be transmitted to the fluent material reservoir 40 and employed to force the fluent material from the reservoir into the fibrous packing rings 13 through distributing ring 31. Connecting with inlet element 30 below valve 41 is a short line 45 controlled by a petcock 46 and having an inlet element 47 adapted to receive a pressure gun where it is desired to use a gun for distributing the fluent material to the packing rings 13, in lieu of utilizing the internal line pressure from within the joint which is made available through line 43.

Assuming that fluent packing material is to be supplied under line pressure from reservoir 40, the joint will be installed and either then or before the reservoir 40 will be filled with fluent packing material with valves 41 and 48, and petcock 46 closed. If the expansion joint be put into operation under high pressure with blowoff valve 52 closed, such pressure may seep into the chamber housing packing rings 13 under some circumstances. Blowoff valve 52 is opened which will relieve the packing rings of any effects of line pressure and facilitate the distribution thereto of the fluent packing material. Valves 48 and 41 will then be opened with the result that line pressure will be supplied to reservoir 40 and force fluent material therefrom through inlet element 30 and distributing ring 31 into the fibrous packing rings 13. Through the use of blowoff valve 52, as just stated, there will be no counteracting pressure to retard the proper distribution of the fluent packing material so that the voids of the fibrous packing are completely filled with the fluent packing. By now closing valve 52 and leaving valves 48 and 41 open, the packing rings will be subject to line pressure on both the inner and outer sides, and because of such equalization there is no tendency for the fluent packing material to flow, and an extremely effective seal is maintained in this manner between the inner and outer joint members. It will be evident that valves 41 and 48 may be closed, if so desired, but it is ordinarily considered desirable to leave them open except during replacement of the fluent material supply in reservoir 40 due to the gradual escape of pressure and possible loss in fluent material outwardly between the inner joint member and the gland element.

It is found that with either of the constructions shown the fluent packing material may be successfully distributed to all parts of the fibrous packing rings so as to produce a highly efficient seal capable of withstanding relatively high operating pressures within the expansion joint. The fibrous packing will have a substantially longer useful life without breaking down, and the problem of leakage is greatly reduced. If and when leakage should occur during operation it is unnecessary to make any adjustment of the packing gland element, but instead the seal may be reestablished by applying an additional quantity of fluent packing material through the inlet port so as to build up the pressure of the fluent material in chamber 12, and increase the amount of fluent material in the portion of the chamber housing the fibrous packing rings.

We claim:

1. A packed-type expansion joint employing fibrous packing impregnated with auxiliary fluent packing for sealing the joint against leakage, said joint comprising telescoping inner and outer joint members, an annular packing chamber in the outer joint member having closed opposite ends, fibrous packing material filling said chamber making sealing engagement with the periphery of the inner joint member, inlet means in the outer joint member for admitting from without the joint fluent packing material under pressure for impregnating the fibrous packing material, and means for distributing said fluent packing material uniformly throughout the fibrous packing material in the packing chamber comprising a rigid annular member forming the outer wall of the packing chamber, an annular distributing space for fluent packing material in the outer joint member surrounding said annular member, said annular space communicating with said fluent packing material inlet means and having closed opposite ends, and a multiplicity of apertures through said annular member disposed at recurrent spaced local points both circumferentially and lengthwise thereof for the admission of fluent packing material from said distributing space into the fibrous packing material in the packing chamber.

2. A packed-typed expansion joint employing fibrous packing impregnated with auxiliary fluent packing for sealing the joint against leakage, said joint comprising telescoping inner and outer joint members, an enlargement in the bore of the outer joint member adjacent the end thereof forming an annular space around the inner joint member, a rigid ring dividing said annular space into an inner packing chamber and an outer annular distributing space, means closing the inner end of both said packing chamber and distributing space, a member detachably secured to the end of the outer joint member and closing the outer end of both the packing chamber and distributing space, fibrous packing ring means filling the packing chamber and making sealing engagement with the periphery of the inner joint member, inlet means in the outer joint member for admitting fluent packing material from without the joint under pressure into the outer distributing space for impregnating the fibrous packing material in the packing chamber, and apertures through the rigid ring for distributing fluent packing material from the distributing space uniformly throughout the fibrous packing rings in the packing chamber and being located at recurrent spaced points throughout substantially the entire length and circumference of said ring.

3. An expansion joint according to claim 2 wherein the rigid ring is formed with a series of interrupted ribs dividing the distributing space into a plurality of channels registering with the apertures through the ring.

4. An expansion joint according to claim 1 further including means connecting with the fluent material inlet means in the outer joint member for forcing fluent packing material through the annular distributing space and into the fibrous packing in the packing chamber under the operating pressure interiorly of the joint.

ROBERT HALL.
HAROLD R. RHODES.